July 25, 1967  J. B. JESSUP ETAL  3,332,638
RETRACTOR DEVICE WITH BRAKE
Filed Aug. 26, 1965  2 Sheets-Sheet 1
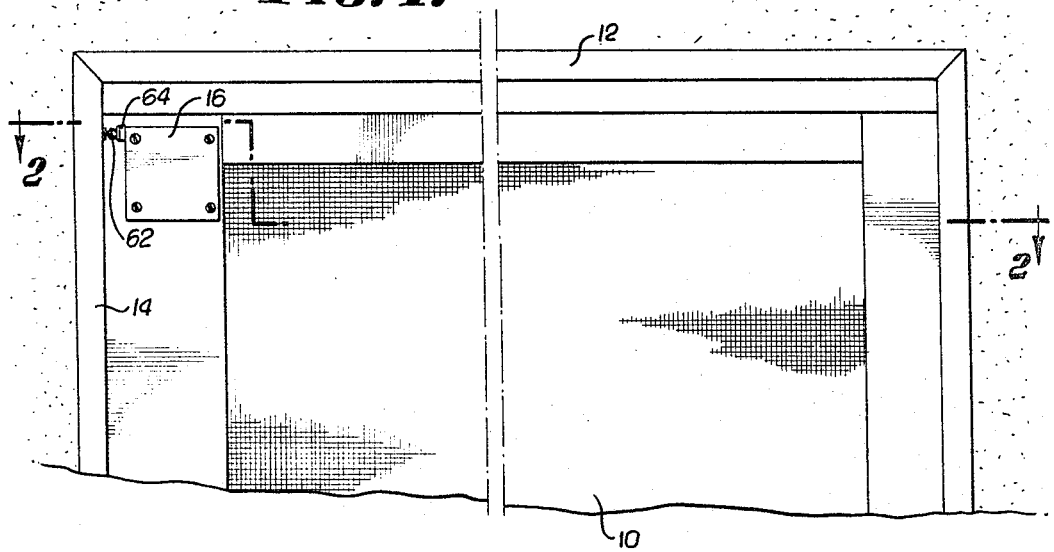
FIG. 1.
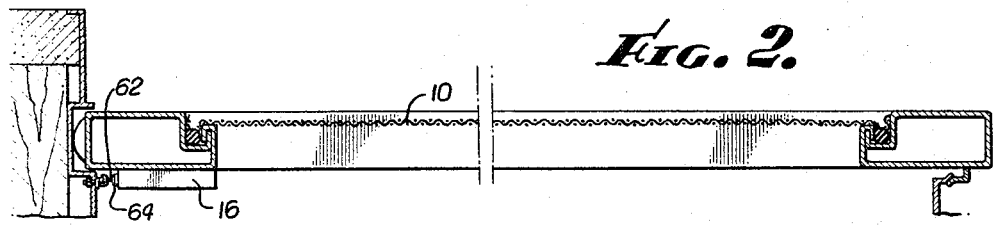
FIG. 2.
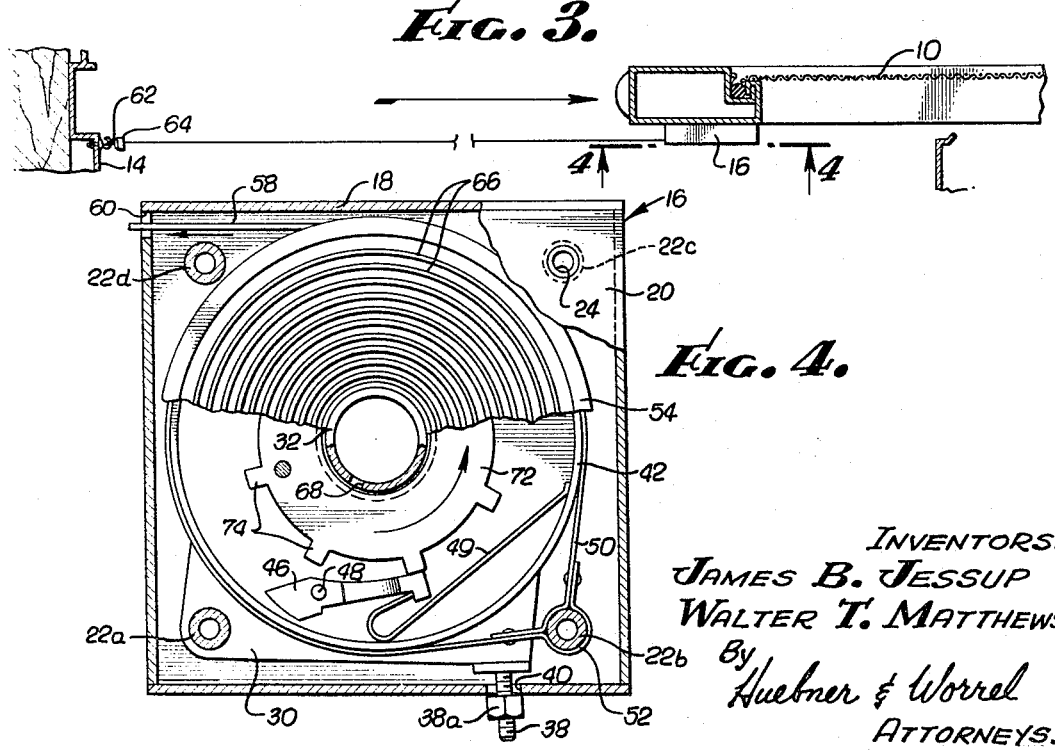
FIG. 3.
FIG. 4.
INVENTORS.
JAMES B. JESSUP
WALTER T. MATTHEWS
By Huebner & Worrel
ATTORNEYS.

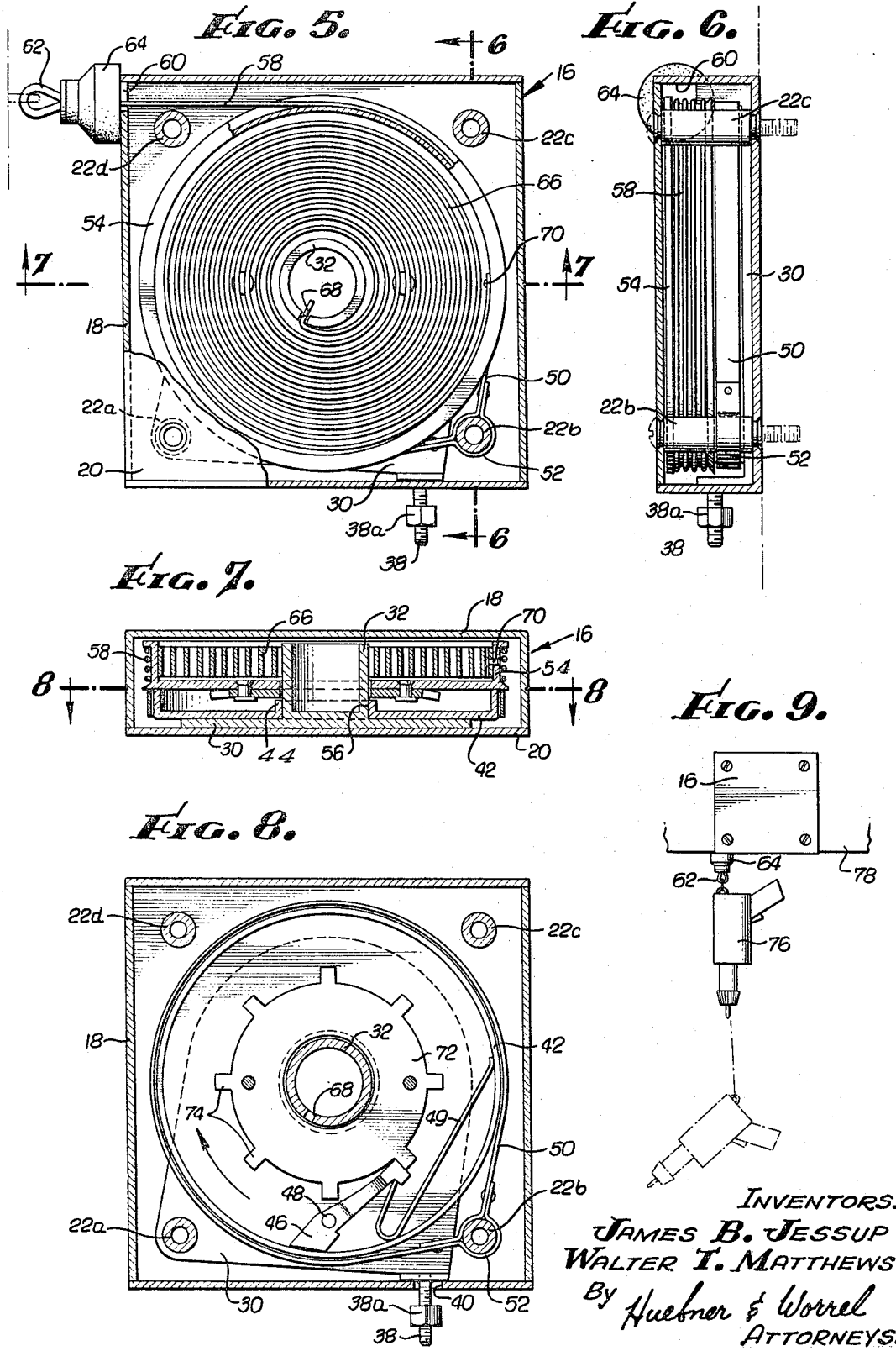

United States Patent Office 3,332,638
Patented July 25, 1967

3,332,638
RETRACTOR DEVICE WITH BRAKE
James B. Jessup, Los Angeles, and Walter T. Matthews, Van Nuys, Calif., assignors to Duplex, Inc., Los Angeles, Calif., a corporation of California
Filed Aug. 26, 1965, Ser. No. 482,747
14 Claims. (Cl. 242—107.3)

ABSTRACT OF THE DISCLOSURE

The device is a cable retractor wherein a cable assembly and a brake assembly are interrelated in a manner permitting unwinding of a cable from a drum against opposition of a spiral spring but without any braking interference, and providing a braking action to retard retraction as the cable is allowed to rewind on its drum, such braking action decreasing as rewinding proceeds.

This invention relates to a retractor device controlled by a brake, and more particularly to a retractor device tensioned by a spiral spring which is damped by the retractor brake.

Retractor devices which incorporate a resiliently biased cable drum rotatable on an axle within a housing are well known in the prior art. In such retractor devices a tensioned spiral spring is secured at its inner end to the axle and at its outer end to the cable drum. A flexible member such as a cable, wire or tape is secured to the periphery of the drum and provided with an attaching device at its free end which is adapted to extend through an opening in the retractor housing. The retractor is mounted on a sliding door, for instance, and the free end of the cable is attached near the door jamb against which the door is to be closed. When the door is opened, it is resiliently urged to close by tension provided by the spiral spring. A disadvantage of such retracting devices is that the spring may be so highly tensioned that it will slam the sliding door closed too quickly, sometimes resulting in parts of the door being damaged. On the other hand, too weak a spring action can result in a slow and possibly incomplete closing of the door. Thus, there is a need for apparatus which will cushion and control the tensioned-pull of such retracting devices. The use of such a device is not limited to a sliding door, which is mentioned as an example only.

Therefore, an object of the present invention is to provide a retracting device incorporating a cable drum tensioned by an internal spiral spring that is damped by a novel braking means.

A further object of this invention is to provide a retracting device which automatically retracts a tensioned cable in a smooth, cushioned manner.

A still further object of this invention is to provide a braking means for a retracting device incorporating a spiral spring which tensions a flexible member and biases it to become wound around a rotatable cable drum within the retracting device, wherein the braking means includes a rotatable brake drum which becomes locked to the cable drum when the flexible member is being wound around the cable drum and a brake band which becomes frictionally engaged to the brake drum in gripping proportion to the amount of tension on the flexible member.

Other objects and advantages will become apparent from the following illustrative description and drawings.

In the drawings:
FIGURE 1 is a fragmented elevational view of the subject retracting device attached in operative position to a sliding screen door showing the surrounding doorway.
FIGURE 2 is a sectional view taken on line 2—2 of FIGURE 1.

FIGURE 3 is a sectional view of the apparatus as shown in FIGURE 2 with the sliding door opened.
FIGURE 4 is a partially sectioned view of the retracting device showing the cable being unwound.
FIGURE 5 is another sectional view of the retracting device showing the spiral spring and cable in retracted position.
FIGURE 6 is a cross-sectional view taken on line 6—6 of FIGURE 5.
FIGURE 7 is a cross-sectional view taken on line 7—7 of FIGURE 5.
FIGURE 8 is a sectional view of the retracting device similar to FIGURE 4, with parts in a different operative position.
FIGURE 9 is a view of the retractor mounted on the overhead structure of a work bench in a manner to support a tool such as a drill.

The invention in general comprises a spring tensioned cable drum coaxially associated with a brake drum and mechanically related in a manner so that when the cable is pulled out the cable drum rotates on an axle independently of the brake drum, but when the cable is retracted the cable drum interlocks with the brake drum in a manner to rotate the brake drum coincidently with rotation of the cable drum. A brake band encircles the brake drum and has its ends fixedly secured. The axle is mounted on an axle plate which is pivotally mounted for a restricted arcuate (lateral) movement. A relatively strong pull on the cable shifts the axle plate, and with it the cable drum and brake drum laterally away from the fixed securement of the brake band and applies the braking action. As tension decreases the axle drum tends to shift in the opposite direction to reduce the braking action. The result is a self-regulating braking action. The device will now be described in more detail.

A typical sliding screen door 10, as shown in FIGURES 1, 2 and 3, is mounted in a doorway frame 12, and closes on a door jamb 14. A retractor 16 in accordance with this invention is secured to the door 10.

The preferred form of retractor 16 includes a housing which is shaped like a shallow box, and is comprised of mating base member 18 and cover 20. Protruding vertically from the corners of base member 18 are tubular posts 22a, 22b, 22c and 22d. Matching holes 24 are provided in the cover 20. Preferably the tubular posts are hollow spacing rivets which afford means for receiving screws for mounting the retractor, and also provide mountings for an axle plate 30 and a brake band to be later identified.

The axle plate 30, which includes a centrally disposed axle 32 extending substantially perpendicular to the plane of plate 30, is pivotally secured on tubular post 22a. When plate 30 is pivoted, axle 32 moves in a limited arc around the axis of the post. A threaded stud 38 extends from a corner of the plate 30 through hole 40 in the side of base member 18 in a position relatively remote from pivot post 22a. A nut 38a is threaded on the stud outside of base member 18, and provides an adjustable means to limit the extent which axle plate 30 can be pivoted.

Mounted on top of the axle plate 30 is a brake drum 42, which is shaped like a shallow cylindrical dish. It has a centrally disposed hub 44 journaled on axle 32 about which it is free to rotate. A ratchet latch 46 is pivotally mounted by means of pin 48 on the upper face of brake drum 42. It is resiliently biased axially by a latch spring 49.

A brake band 50 encircles most of the periphery of brake drum 42, and its ends are secured on tubular post 22b by a closed loop 52. Brake band 50 is disposed so that the rotational frictional resistance between it and the periphery of the brake drum will vary in accordance with the extent that axle plate 30 and axle 32 are shifted laterally.

Mounted on top of the brake drum is a cylindrical shallow dish-shaped cable drum 54, rotatably journaled about axle 32, which protrudes through central opening 56 constituting a hub in the cable drum. Flexible cable member 58 is attached to cable drum 54 in such a manner that the cable is wound around the periphery of drum 54 when it is rotated clockwise as seen in FIGURE 5. The free end of the cable extends through a slot 60 in the side of base member 18 in a location remote from where the brake band 50 is secured to the post 52. Preferably, the slot 60, the posts 22a and 22b generally form the points of a triangle of which post 22a is the apex. The free end of cable 58 is provided with attaching loop 62 and a cable stop 64 which is large enough to prevent the free end of the cable from passing through slot 60. A flat spiral spring 66 is enclosed within the cable drum 54 and has its inner end secured within a slot 68 in the axle 32, and its outer end secured by a rivet 70 to the cable drum. This spring biases rotation of the cable drum in a clockwise direction (as seen in FIGURE 5) and provided a predetermined amount of tension on the cable 58.

A circular ratchet plate 72 having peripheral ratchet teeth 74 is riveted or otherwise rigidly mounted on the bottom face of the cable drum adjacent the upper face of the brake drum. The radius of the ratchet plate and the length of the ratchet teeth are such that ratchet latch 46 will resiliently bear against the periphery of ratchet plate 72, and yields to slide past teeth 74 as the plate is rotated counterclockwise. Thus, the ratchet plate 72 can be rotated counterclockwise, but not clockwise, relative to latch 46, since in the latter case the end of latch 46 will lodge against one of the ratchet teeth as shown in FIGURE 8.

In operation, when cable 58 is unwound, it rotates the cable drum 54 and ratchet plate 72 counterclockwise, and ratchet latch 46 rides freely against the periphery of the ratchet plate including ratchet teeth 74, without interfering with rotation. However, if cable 58 is released, it is resiliently urged by spring 66 to rotate in a clockwise direction, whereupon the end of the ratchet latch 46 lodes against a ratchet tooth. Thus, the cable drum 54 and brake drum 42 become locked together so that further clockwise rotation that takes place will result in the periphery of the brake drum 54 rotating in the brake band 50.

A braking action on the brake drum, and consequently the cable opposing the force of the spiral spring 66, is now available, depending on adjustment of the nut 38a on the stud 38. If the adjustment is such that the axle plate cannot pivot, there will be only slight frictional engagement, and consequent braking effect, created between brake drum 42 and brake band 50. When the restriction on axle plate 30 is removed so that it can pivot sufficiently, a significant braking effect will result from tight frictional engagement between brake drum 42 and brake band 50.

By adjusting the amount that axle plate 30 can pivot, so that tension on cable 58 will cause enough frictional engagement between brake drum 42 and brake band 50 to slow the spring biased winding of cable 58 without stopping it, a controllable damping effect is created. Since the amount of frictional engagement, and hence damping effect, will vary in accordance with the amount of tension on cable 58, the damping effect will be greatest when spring 66 is unwound the most, and least when spring 66 is unwound the least. Thus, a relatively smooth and self-regulating damping effect is created which will prevent spring 66 from winding cable 58 so quickly as to cause it to snap back into retractor 16.

A retractor capable of smoothly retracting a flexible member as hereinafter described, can be used for a variety of purposes, and is not limited merely to the sliding screen door described. It can be applied to a sliding glass door, requiring a heavier spring than for the lighter screen door. As another example, retractor 16 in FIGURE 9 is used to suspend a drill 76 from an overhead bench 78 so that it is out of the way when not being used but is conveniently accessible.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

What is claimed is:

1. A retractor comprising: a housing; an axle mounted in said housing for movement laterally of the axle axis; a rotatable cable drum journaled on said axle; a flexible member having one end attached to said cable drum and its free end extending from said housing; a spiral spring within said housing rotatably biasing said cable drum to wind said flexible member around its periphery; a rotatable brake drum journaled on said axle; a ratchet means disposed so as to lock said cable drum and brake drum together only when said cable drum is rotated in the direction to wind said flexible member around said cable drum; a brake band surrounding said brake drum; mounting means for said brake band disposed in said housing in a position whereby tension on said flexible member imparted by unwinding the same moves said axle laterally in a direction to cause, said brake band to bear against the periphery of said brake drum so as to create frictional engagement between said brake band and brake drum in proportion to the amount of tension on said flexible member.

2. A retractor as defined in claim 1, wherein said axle is attached to an axle plate pivotally mounted in said housing.

3. A retractor as defined in claim 2, wherein said spiral spring is enclosed within said cable drum, and has its outer end attached adjacent to said cable drum adjacent the periphery thereof, and its inner end attached to said axle.

4. A retractor as defined in claim 3, wherein said ratchet means comprises a ratchet latch pivotally mounted on said brake drum, resilient means biasing an end of said latch toward the axis of the axle, and a circular ratchet plate having a plurality of teeth on its periphery mounted on said cable drum adjacent said ratchet latch disposed in such a manner that when the cable drum rotates in the direction which winds said flexible member around its periphery, said ratchet latch lodges against one of said ratchet teeth, but slips past the teeth when the cable drum is rotated in the opposite direction.

5. A retractor as defined in claim 3, wherein the means mounting said brake band is located remote from the pivotal mounting of said axle plate, and the location in said housing where said flexible member enters the housing when it is being wound around said cable drum is remote from both said last named means and said pivotal mounting.

6. A retractor as defined in claim 3, wherein the retractor housing and the free end of the flexible member are each attached to separate structures which are movable relative to each other.

7. A retractor as defined in claim 3, wherein said housing is in the form of a shallow box comprising mating half-box parts, at least two laterally spaced tubular rivet posts extend between said half-box parts to provide a means for securing them together, one of said posts providing the pivotal mounting for the axle plate, and said brake band being secured to another of said posts providing the mounting means for the brake band.

8. A retractor comprising: a housing; an axle plate pivotally mounted within said housing for generally lateral movement, said axle plate having an axle extending substantially normal to said axle plate within said housing; a brake drum mounted on said axle plate and rotatably journaled about said axle, said brake drum embodying an axially biased, pivotally mounted ratchet latch; a brake band secured to said housing extending around the periphery of said brake drum in such a manner that a variable amount of frictional engagement will occur between the brake band and brake drum which is controlled by the amount of tensional force causing the axle plate to move laterally; a cable drum mounted on said brake drum and rotatable journaled about said axle, said cable drum having a ratchet which engages the ratchet latch on the brake drum in such a manner that it can rotate freely relative to the brake drum in one direction, but is stopped from rotating in the other direction relative to the brake drum, so that the brake drum and cable drum become locked together, and any further relative rotation takes place between the periphery of the brake drum and the brake band; a flexible member secured to said cable drum adapted to be wound around the periphery thereof when said cable drum is rotated in the direction in which it locks with the brake drum, said flexible member having a free end extending from said housing; and a spiral spring disposed within said cable drum with its outer end secured to said cable drum, and its inner end secured to the axle of said axle plate, said spring being wound tightly enough to rotate the cable drum against an opposing force of predetermined magnitude until the free end of the flexible member is pulled adjacent said housing and to tension said flexible member enough to cause pressure between the brake drum and brake band to create sufficient frictional engagement that the rotation of the cable drum is damped when the brake drum and cable drum are locked together.

9. A retractor as defined in claim 8, wherein the ratchet is a circular disk which includes a plurality of peripheral ratchet teeth, and the ratchet latch lodges against one of said ratchet teeth to lock the brake drum and cable drum together when the flexible member is being wound around the rotating cable drum.

10. A retractor as defined in claim 9, wherein said brake band is secured to said housing remote from the pivotal mounting of said axle plate and the location in said housing where said flexible member enters the housing when it is being wound around said cable drum is remote from where said brake band is secured to said housing.

11. A retractor as defined in claim 10, wherein the retractor housing and the free end of the flexible member are each attached to separate structures which are movable relative to each other.

12. A retractor as defined in claim 10, wherein the housing is in the form of a shallow box comprising mating half-box parts, at least two laterally spaced tubular posts extend between said half-box parts to provide a means for securing them together, said axle plate is pivotally journaled about one of said posts, and said brake band is secured to another of said posts.

13. A retractor device comprising a flexible member, a rotatable cable drum about which the flexible member is wound, a spiral spring rotatably biasing the cable drum, a braking means associated with the cable drum which comprises a rotatable brake drum, ratchet means which locks the brake drum to the cable drum only when the flexible cable drum is rotated by the spiral spring in the direction to wind up the flexible member, a brake band extending around the periphery of the brake drum, means mounting the brake band in a fixed position, and means shiftably mounting the brake drum for movement to interengage the brake drum and brake band when the cable drum is rotated in the direction to wind up the flexible member.

14. A retractor comprising an axle, means mounting said axle shiftably in a direction laterally of its axis, a cable drum and a brake drum coaxially mounted for rotation on said axle, a cable on said cable drum and a spiral spring within said drum for winding the cable on the drum and yieldably resisting unwinding of the cable, means interlocking the two drums only in the wind-up direction of rotation, a brake member for engagement with the brake drum, means mounting said brake member in a fixed position relative to said axle mounting means, whereby shifting of the latter will engage or disengage the brake drum and the brake member, the cable drum being free of any braking action as the cable is unwound from the cable drum, but subject to braking action directly proportionate to the amount of tension on said cable which moves said axle as the cable winds up on the cable drum.

References Cited
UNITED STATES PATENTS

| | | | |
|---|---|---|---|
| 2,079,054 | 5/1937 | Vadasz | 188—82.1 X |
| 2,159,004 | 5/1939 | Bosch | 242—107.7 |
| 2,460,904 | 2/1949 | Reyburn | 188—82.1 X |
| 2,559,050 | 7/1951 | St. Clair | 242—107 X |
| 2,586,386 | 2/1952 | Ryan | 242—107.6 |
| 3,020,580 | 2/1962 | Glenn | 16—61 |

FRANK J. COHEN, *Primary Examiner.*

W. S. BURDEN, *Assistant Examiner.*